May 8, 1934.  E. J. POTTS ET AL  1,958,312
GLIDER
Filed Sept. 25, 1933   2 Sheets-Sheet 1

Elroy J. Potts
Charles A. Sheldon, INVENTORS
BY Victor J. Evans & Co.
ATTORNEY

May 8, 1934.　　　　E. J. POTTS ET AL　　　1,958,312
GLIDER
Filed Sept. 25, 1933　　2 Sheets-Sheet 2

Elroy J. Potts
Charles A. Sheldon,
INVENTORS

BY Victor J. Evans & Co.
ATTORNEY

Patented May 8, 1934

1,958,312

UNITED STATES PATENT OFFICE 1,958,312

GLIDER

Elroy J. Potts and Charles Arthur Sheldon, Hudson, N. Y.

Application September 25, 1933, Serial No. 690,917

2 Claims. (Cl. 280—9)

This invention relates to attachments for baby carriages and has for the primary object the provision of means whereby an ordinary baby carriage or vehicle may be easily and quickly converted into a sleight or glider for travel over snow and ice and when not so employed will provide efficient mudguards for wheels of the carriage or vehicle.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a side elevation, partly in section, illustrating a baby carriage or vehicle with an attachment applied thereto and constructed in accordance with my invention.

Figure 1:
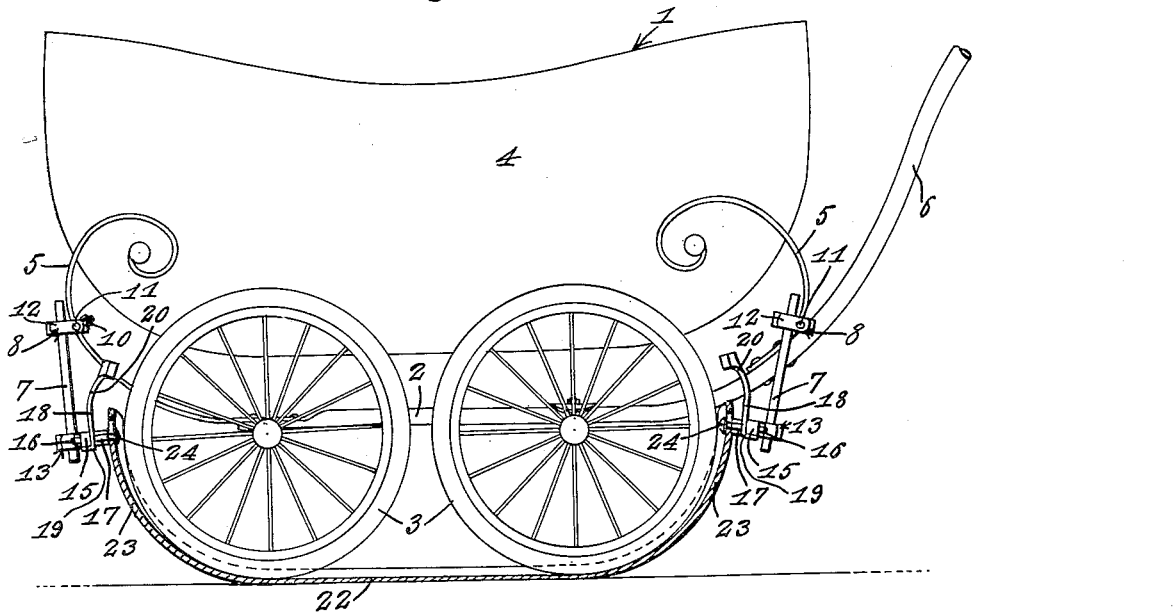

Referring in detail to the drawings, the numeral 1 indicates a conventional type of baby carriage or vehicle consisting of a frame 2 supported by ground wheels 3 arranged in front and rear pairs. A body 4 is supported on the frame 1 by springs 5. The frame 2 extends rearwardly of the body to form the usual handle 6.

The foregoing description clearly describes a conventional type of baby carriage or vehicle to which our invention is attached.

Front and rear supporting arms 7 in the form of rods are adjustably secured to the springs of the carriage or vehicle 1 by brackets 8. Each bracket 8 consists of clamping plates 9 connected by bolts 10 and are adapted to grip the spring of the carriage or vehicle. One of the plates 9 is of a greater length than the other and is reduced to form an extension 11 fitted in a block 12 to which is adjustably secured the arm 7. A similar block 13 is mounted on the arm 7 and has adjustably connected thereto an arm 14 arranged at substantially right angles to the arm 7 and carries a block 15. A bolt 16 is carried by the block 15 and has mounted thereon a spacer 17. The bolt 16 extends through a bracket 18 with a portion of the latter lying between the block 15 and the spacer 17. One end of the bracket is bent to form a flange 19 underlying the block 15. The bracket 18 is bent to form a rest 20 carrying padding 21.

Figure 2:
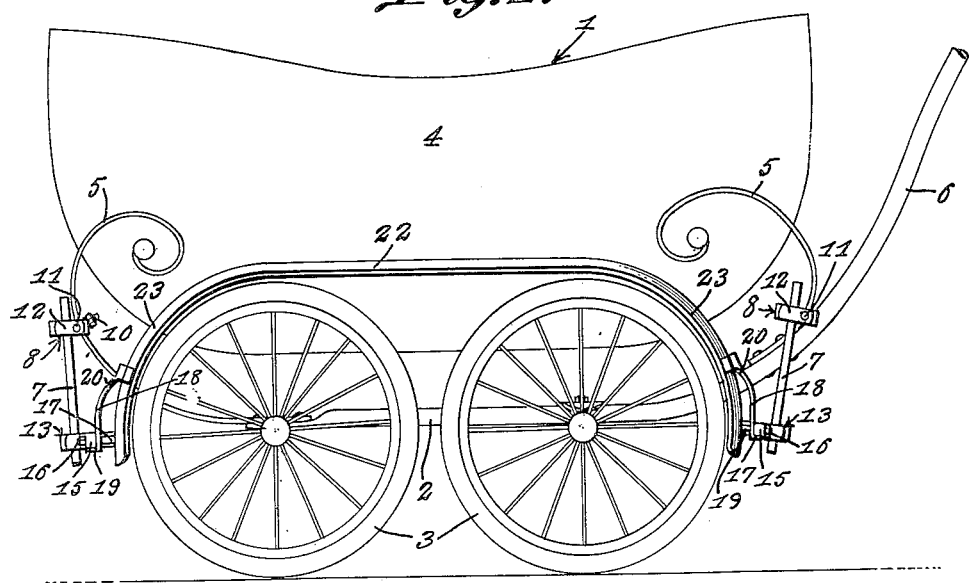
Figure 2 is a side elevation showing the attachment positioned to act as mudguards for the wheels of the vehicle or carriage.
Figure 3:
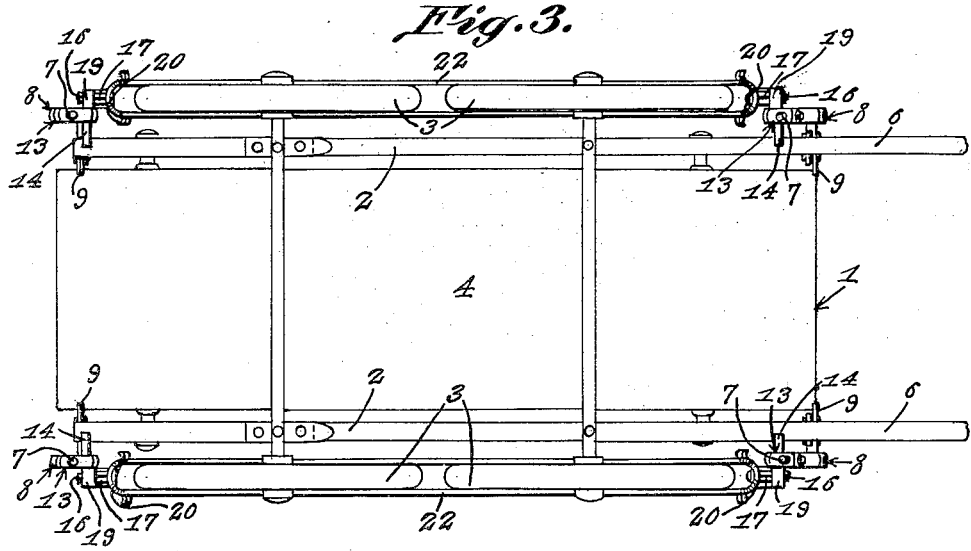
Figure 3 is a top plan view illustrating the device positioned to form a sleigh or glider of the vehicle or carriage.
Figure 4:
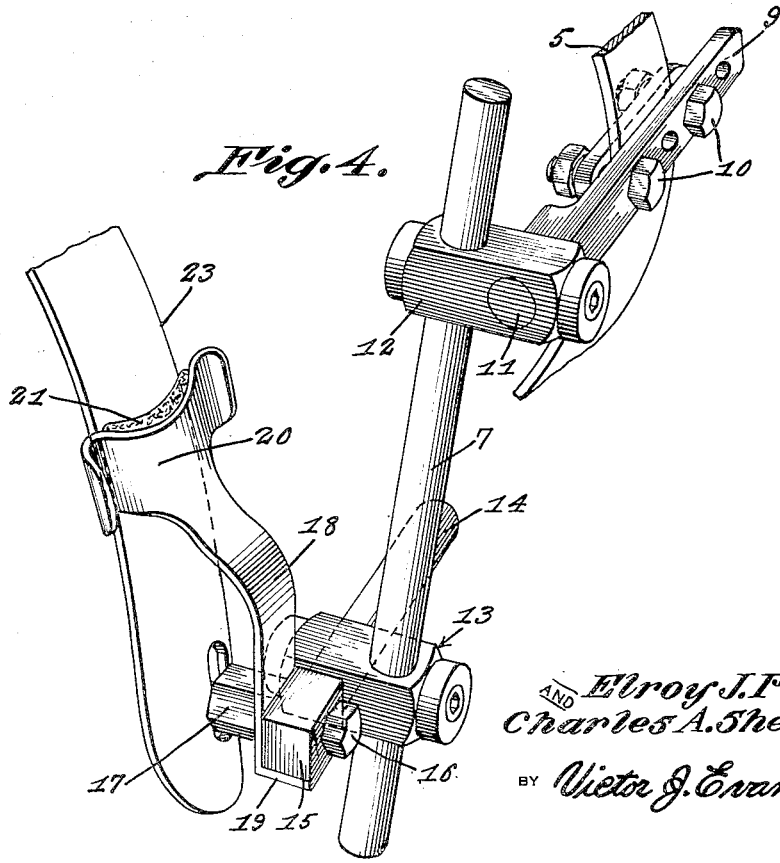
Figure 4 is a fragmentary perspective view illustrating one of the brackets for adjustably connecting the combined runner and guard to the carriage or vehicle.

Associated with the wheels of the carriage or vehicle are runner-like elements 22, each having its end arcuately curved, as shown at 23, and provided with slots to receive the bolts 16 and are secured against the spacers 17 by nuts 24 threaded to the bolts. The runner-like members 22 may be positioned under the wheels, as shown in Figure 1, for the purpose of converting the carriage or vehicle into a sleigh or glider and each runner-like element 22 is transversely curved to fit the peripheries or tires of the wheel. To employ the carriage or vehicle in an ordinary manner, that is, the wheels coming in contact with the ground, the runner-like elements 22 are shifted from the positions shown in Figure 1 to overlie the wheels, as shown in Figure 2, acting as mudguards for the wheels. The runner-like elements 22 when in the positions shown in Figure 2 engage the rests 20.

From the foregoing description, taken in connection with the accompanying drawings, it will be seen that an attachment has been provided for a baby carriage or vehicle which may be easily and quickly applied thereto and adjusted into several positions so as to act as mudguards for the wheels or as runners for the vehicle or carriage. A baby carriage equipped with an attachment of this character permits the use of the carriage in all climatic conditions and provides a device which will be more healthier for the child due to the fact that the child can be conveniently taken out in the carriage while snow or ice is upon the ground and as well as if the ground was clear of snow or ice.

While we have shown and described the preferred embodiment of our invention, it will be understood that minor changes in construction, combination and arrangement of parts may be made without departing from the spirit and scope of our invention, as claimed.

Having described the invention, we claim:

1. In combination with a baby carriage having ground wheels and body supporting springs, brackets adjustably secured to said springs, arms carried by said brackets, blocks adjustably secured to said arms, bolts carried by said blocks, runner-like elements having arcuately curved end portions slotted to receive said bolts and adapted to either underlie or overlie the wheels, arms secured to the blocks by said bolts and bent to form rests to engage the runner-like elements when positioned to overlie the wheels.

2. In combination with a baby carriage having ground wheels and body supporting springs, brackets adjustably secured to said springs, depending arms adjustably secured to said brackets, horizontally arranged arms adjustably secured to the first-named arms, blocks secured to the second-named arms, bolts carried by said blocks, runner-like elements slotted to receive said bolts and adapted to either underlie or overlie the wheels, and rests secured to the blocks by the bolts to engage the runner-like elements when positioned to overlie the wheels.

CHARLES ARTHUR SHELDON.
ELROY J. POTTS.